Patented Dec. 19, 1950

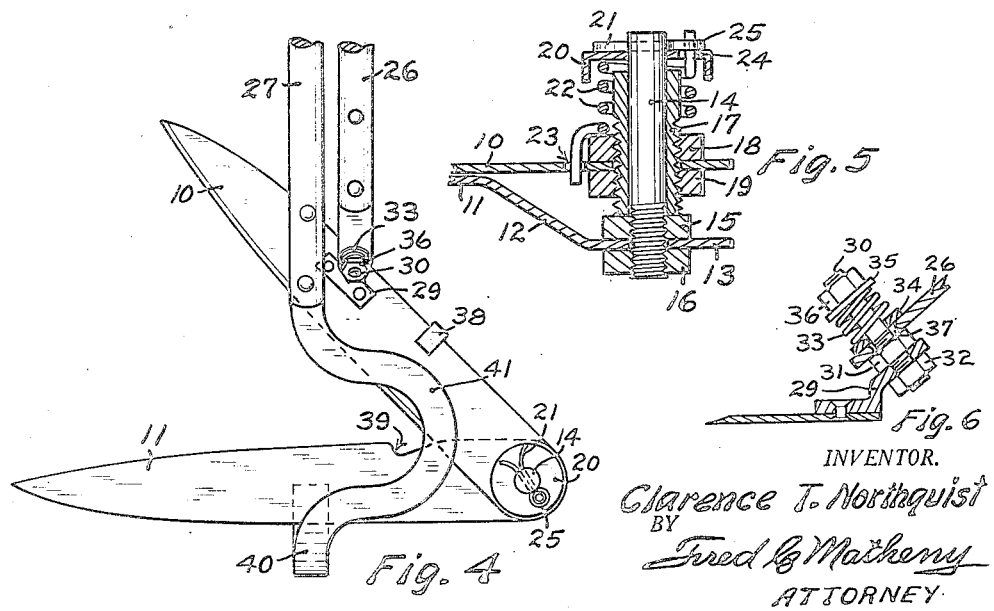

2,534,924

UNITED STATES PATENT OFFICE 2,534,924

MANUALLY OPERATED VEGETATION CLIPPER

Clarence T. Northquist, Seattle, Wash., assignor of one-third to George O. Brown, Seattle, Wash., and one-third to Lilah Brown Johnson, Minneapolis, Minn.

Application February 5, 1948, Serial No. 6,519

2 Claims. (Cl. 30—253)

This invention relates to a manually operated clipper for use in cutting or trimming vegetation such as grass, weeds, shrubbery, hedges and the like.

An object of this invention is to provide a manually operated clipper for lawn and yard use which will reduce fatigue on the part of the user and speed up the kind of lawn work ordinarily done with a lawn clipper or shear.

Manually operated lawn clippers or shears of the type now in common use are tiring as they often require the operator to bend over for long periods of time or to get down on his hands and knees or to sit or lie on the ground to do the required work.

It is an object of this invention to provide a clipper which can be operated with ease from a standing position, thus obviating the necessity for bending over or getting down on the ground when using the clipper and in this way greatly reducing the fatigue which arises from postures that tire the user.

It is a further object of this invention to provide a manually operated clipper that will greatly increase the effective reach of the user and make it possible to trim vegetation that can not easily be reached with an ordinary clipper, such as trimming grass under and around shrubbery or trimming vegetation too high for a person to reach.

Another object is to provide a manually operable lawn clipper or shear which can be operated without subjecting the hands of the user to a severe gripping strain.

Another object of this invention is to provide a manually operable clipper or shear in which two shear blades are positioned approximately crosswise of and at an angle to two relatively long handles so that the handles can be operated by a person standing erect to open and close the blades for cutting purposes when the blades are on or near the ground.

Other objects of the invention are to provide a manually operated clipper that is simple and durable in construction, efficient in use, easy to operate and not expensive to manufacture.

Other objects will be apparent from the following description taken in connection with the accompanying drawings.

In the drawings:

Figure 1 is a perspective view of a clipper constructed in accordance with this invention, showing the clipper blades in a closed or overlapped position.

Fig. 2 is a fragmentary view of the same partly in section and partly in elevation taken substantially on broken line 2—2 of Fig. 1.

Fig. 3 is a fragmentary plan view looking down on the clipper blades and showing said blades in a partly open position.

Fig. 4 is a fragmentary plan view similar to Fig. 3 showing a handle of modified shape and showing the blades of the clipper fully open.

Fig. 5 is a sectional view showing pivot joint means by which two clipper blades are connected together.

Fig. 6 is a view partly in section and partly in elevation showing pivot joint means used to connect a handle with a blade.

Like reference numerals designate like parts throughout the several views.

These shears comprize two blades, herein termed an upper shear blade 10 and a lower shear blade 11. Preferably each shear blade 10 and 11 is rounded at one end and pointed at the other end and the coacting edges of these blades are sharpened. Preferably the lower blade 11 has a downwardly offset portion adjacent its rounded end to help provide space for pivot means used to connect the two blades and to provide better spring action for holding the cutting edges of the blades in contact with each other. This downwardly offset portion of the lower blade 11 comprises a downwardly inclined section 12 and a terminal section 13 which is parallel to the blades 10 and 11.

The pivot means shown in Fig. 5 for connecting the two shear blades 10 and 11 comprises a bolt 14 secured by two nuts 15 and 16 to the terminal section 13 of the lower blade 11. The bolt 14 is operable in a sleeve 17 which is secured by two nuts 18 and 19 to the upper shear blade 10. A cap or washer 20 is provided on the upper end portion of the bolt 14 and a cotter pin 21 extends transversely through the bolt 14 above the cap 20 and secures the several parts in assembled relation. A coiled spring 22 is provided on the sleeve 17 between the top nut 18 and the cap 20. The lower end portion of the spring 22 extends downwardly through a perforation 23 in the upper blade 10. The upper end portion of said spring 22 extends upwardly through an opening 24 in the cap 20 and through an eye in the head portion 25 of the cotter pin 21. This connects one end of the spring 22 with the lower shear blade 11 and the other end of the spring 22 with the upper shear blade 10 for torsion purposes. The spring 22 is arranged so that it will exert a torque tending to move the two blades 10 and 11 into a closed or overlapping position.

Also this spring 22 operates as a compression spring between the cap 20 and the top nut 18 to provide a resilient pressure which tends to urge the two blades 10 and 11 together. The lower end portion of the sleeve 17 engages the nut 15 and these two parts 17 and 15 function as stop means to limit the movement toward each other of the two blade members 10 and 11. Obviously adjustment between the blades 10 and 11 is provided by adjusting either the two nuts 15 and 16 or the two nuts 18 and 19. The sleeve 17 provides a relatively long bearing for the bolt 14 and this helps to provide an efficient and durable pivot joint.

Two handle members 26 and 27 are connected respectively with the top shear blade 10 and bottom shear blade 11. The handle 27 has a hook shaped lower end portion 28 the tip of which extends under the bottom of the lower blade 11 and is rigidly secured to said blade 11. The hook shaped portion 28 extends upwardly from the blade 11 and across said blade and the handle 27 is positioned generally crosswise of the axis of the blade 11 and extends rearwardly from said blade 11 and upwardly from the plane of said blade 11 preferably at an angle of from forty to fifty degrees.

The other handle 26 is pivotally connected with the top blade 10, as by means more fully shown in Fig. 6. This pivot means comprises a bracket 29 rigidly secured to the blade 10, a bolt 30 secured by nuts 31 and 32 to the bracket 29, a compression spring 33, preferably two washers 34 and 35, and a nut 36 on the upper end portion of the bolt 30. The lower end portion of the handle 26 is flat and has a hole 37 therein. The hole 37 is of larger diameter than the bolt 30 and fits over said bolt 30. The flat part of the handle 26 rests on the nut 31 and is yieldingly held by the spring 33. The handle 26 is thus free to move rotatively on the bolt 30 and can be swingingly moved in planes common to the axis of the bolt 30 a limited amount, determined by the oversize of the hole 37. The spring 33 tends to hold the handle 26 at the proper angle.

Obviously the structure of the pivot means for connecting the handle 26 to the blade 10 can be varied.

Preferably a stop member 38 is secured to one of the blades, such as blade 10; and is positioned to engage the other blade 11 to limit the relative closing movement of the two blades.

One of the blades, such as the blade 11 is provided with a notch 39 to facilitate the cutting of twigs, branches, and larger stems of vegetation, as hereinafter more fully explained.

To minimize interference between the fixed handle 27 and the stems or branches which are to be engaged in the notch 39 and cut I may provide at the lower end portion of the fixed handle 27, see Fig. 4, a hook shaped terminal member 40 provided with a transversely curved portion 41 which is offset in the direction of the notch 39. When this is done the notch 39 can be applied to a branch or stalk without contacting the branch or stalk with the fixed handle member.

Except for the terminal handle part 40, all of the other parts shown in Fig. 4, are similar to parts shown in Figs. 1, 2, 3, 5 and 6 and are similarly numbered.

The type of handle shown in Fig. 4 is particularly well adapted for use on shears that are to be used for trimming hedges and like vegetation which has branches or stems of substantial size but this type of handle can be used on grass shears if desired. The notch 39 is positioned between the pivot bolt 14 and the points of connection of the handles 26 and 27 with the blades. This provides an efficient leverage for cutting twigs, branches and stems of larger size. If desired the notch 39 can be omitted from the blades of grass shears.

The two handles 26 and 27 are connected with the blades 10 and 11 approximately midway between the two ends of the blades and the points of connection of these two handles with the blades are preferably offset for convenience of operation. The shears are held and positioned for cutting chiefly by the fixed handle 27 and the cutting is done by longitudinally reciprocating the handle 26 to move the blade 10 across the blade 11. The handles 26 and 27 are long enough so that a person standing erect can position the blades on the ground and operate them. This is true both when the blades are positioned horizontally on the ground as in ordinary cutting, or vertically as in edging. Also this clipper can be used for hedge trimming at any height and for overhead trimming of small branches and leaves.

The reciprocating movement of the handle 26 by which the blades are operated is not tiring to the user and all kinds of clipping work can be rapidly and easily done. The thrust exerted on the handle 26 to impart a cutting stroke to the blade 10 has a component which tends to hold the blade 10 against the blade 11 this insures efficient cutting and tends to keep the blades sharp.

The foregoing description and accompanying drawings clearly disclose a preferred embodiment of my invention but it will be understood that changes in this clipper can be made within the scope and spirit of the following claims.

I claim:

1. A clipper comprising two substantially flat horizontal shear blades pivotally connected together near one end for relative shearing movement; a rigid handle having a hook shaped lower end portion fixedly secured to the lowermost shear blade substantially midway of the length of the blade and extending upwardly and over said two shear blades, the major portion of said handle being positioned substantially transverse to the length of said lowermost shear blade and at an oblique angle to the plane thereof; and another rigid handle pivotally connected with the uppermost shear blade substantially midway of the length of the blade and operable in a position substantially parallel to said first named handle, whereby said two handles cooperate to impart shearing movement to said two shear blades and to hold the shearing edges of said blades in cutting engagement with each other on the cutting stroke in response to relative longitudinal movement of said two handles.

2. A manually operated vegetation clipper comprising two substantially flat superposed shear blades pivotally connected together near one end for relative shearing movement, at least one of said shear blades having a notch in the cutting edge thereof at a substantial distance from said pivot; a rigid handle having a hook shaped lower end portion fixedly secured to the underside of the lower shear blade outwardly from said notch and extending upwardly and across said shear blades, the portion of said handle above said shear blades being transversely curved beyond said notch to provide clearance for stalks of vegetation to which said notch is applied, the major portion of said handle being positioned substantially transverse to the length of the shear blade to which it is connected and at an oblique angle to the plane thereof; and another rigid handle pivotally connected with the upper side of the other shear blade substantially midway of the length of the cutting portion of the blade, whereby it can be positioned alongside of said fixedly connected handle and reciprocably moved endwise to impart downward pressure and shearing movement to said upper shear blade.

CLARENCE T. NORTHQUIST.

REFERENCES CITED

The following references are of record in the file of this patent:

UNITED STATES PATENTS

| Number | Name | Date |
|---|---|---|
| 2,501 | Wendt | Mar. 23, 1842 |

FOREIGN PATENTS

| Number | Country | Date |
|---|---|---|
| 428,784 | Great Britain | May 16, 1935 |
| 478,648 | Great Britain | Jan. 21, 1938 |